Oct. 7, 1952     R. M. BERGLUND     2,612,652
APPARATUS FOR BONING AND SLITTING FISH Filed June 24, 1947                                                           4 Sheets—Sheet 1

Fig. 1

Inventor
Raplh M. Berglund
By Cushman, Darby & Cushman
Attorneys

Patented Oct. 7, 1952

2,612,652

UNITED STATES PATENT OFFICE 2,612,652

APPARATUS FOR BONING AND SLITTING FISH

Ralph Martin Berglund, South Bellingham, Wash., assignor, by mesne assignments, to Pacific Laboratories, Inc., Bellingham, Wash., a corporation of Washington Application June 24, 1947, Serial No. 756,669

17 Claims. (Cl. 17—4)

1

The present invention relates to apparatus for processing fish. The invention provides for the proper removal of the backbone from a whole butchered fish, and for completing the slitting of the fish whereby it is separated into halves in preparation for the subsequent skinning operation. The invention should be distinguished from numerous prior art machines which are concerned with the cleaning of fish, and which are not adapted for the exacting requirements of the boning and splitting operations referred to herein.

An important object of the invention is to provide apparatus which will effectively remove the backbone from the whole but ventrally slit fish, and which will simultaneously sever or slit the fish dorsally throughout its entire length, whereby fish halves are separated from the bone and conveyed from the machine for presentation to a fish skinning machine positioned farther on in the processing line. The apparatus described herein is capable of substantially simultaneously separating a ventrally slit fish into three parts, i. e., the backbone (which is removed from the entire length of the fish, head to tail) and the two body halves. An important feature of the invention is the retaining of the fish in whole form throughout its movement through the machine, and up to the point where the final and most important operations take place, i. e., the removal of the backbone and the dorsal slitting of the fish. By reason of the fact that the fish is retained in its whole form during movement through the machine, it may be handled with greater facility and may be presented with greater accuracy to the apparatus for removing the backbone.

It should be pointed out that various devices which have been heretofore suggested for removing the backbone from the fish have not been entirely practical due to the construction of the backbone removing device itself, and also to the fact that such apparatus had no effective means for accurately presenting the backbone to the removing device. I have found that effective removal of the backbone requires the presentation of the fish in accurate horizontal alignment with the knife or other tool provided for separating and removing the backbone. In developing the apparatus disclosed herein, I have found that the backbone can best be presented to the removing device by keeping the fish in whole condition, although ventrally slit, and moving it along a rail which supports the backbone of the fish, the backbone removing device being fixed in position in alignment with

2 the path of movement of the backbone along said rail.

The apparatus which I have devised are intended to perform the above functions on fish which may vary to a considerable extent in size.

A further purpose of the invention is to provide equipment and methods which will remove the backbone and separate the fish into halves, without cutting away and wasting tender parts of flesh adjacent the backbone of the fish. The present invention is to be distinguished from numerous prior art devices which slit the body of the fish along spaced lines to remove the backbone together with the flesh of the fish adjacent thereto, or various prior art devices which are relatively crude in their operation, in that they gouge out the backbone with resulting injury to the flesh of the fish, and waste thereof.

A further object of the invention is to provide for the removal of the backbone and the separation of the fish into halves, in such manner that the end product delivered from the machine is in the most desirable condition for presentation to fish-skinning apparatus, located farther on in the processing line. In a co-pending application of Gottfried E. Hube, a fish skinning machine is disclosed, comprising a rotating drum around which the fish halves are carried, there being skinning knives presented toward the drum to remove the skin from the flesh. The successful operation of such a skinning machine is greatly enhanced by presentation of fish halves thereto which are in firm and tidy condition, as distinguished from the torn and otherwise distorted condition which resulted from the use of prior art equipment employed in slitting the fish, or in removing the backbone therefrom.

A further object of the invention is to provide a machine of the above type which is highly mechanical, capable of great speed, compact, and which requires only a limited number of operators. The machine of this invention may be usefully employed in a canning plant as a part of the line of machinery, the fish being moved in an orderly way from the fish bin to the butchering device, thence to the apparatus of this invention wherein the fish is slit and the bone removed, thereafter proceeding to the skinning device and to the cutter and can filling apparatus.

In general, the machine disclosed herein comprises a central longitudinal rail along which the slit fish are carried by side conveyor chains equipped with laterally presented spikes which impale the fish. At the entrance end of the machine, there is a retractible horse which serves to properly dispose the fish on the rail, dorsal side up, and with the backbone of the fish indexed on the rail for final presentation of the bone remover at the exit end of the machine. It will be understood that the fish which are presented to this machine have ordinarily been operated on by a butchering device known as an iron chink, which cleans out the belly cavity, removes the dorsal and ventral fins as well as the head and tail parts, but does not slit the fish on the ventral side from the anus to the tail. Adjacent to the horse of the machine, there is a lower cutting disc which completes the slitting of the butchered fish. At the discharge end of the machine there is an upper cutting disc which completely opens the fish at its dorsal side at the same time that the backbone is removed from the fish. A whole though ventrally slit fish is conveyed throughout substantially the entire length of the machine. By processing the fish in this condition, great advantage is had in proper presentation of the backbone to the boning device, as will be apparent.

There are a number of cooperating elements in the organization of the machine disclosed herein, all of which form an important part of the invention as they cooperate toward the final operations performed, i. e., the removal of the backbone and the dorsal slitting of the fish into halves. These cooperating elements include yielding centering guides which stabilize the fish during its movement along the central rail, both against undesirable horizontal and vertical movements. These guides, as well as other elements including the retractible horse for properly delivering the fish to the conveyor, are of such design as to be useful with fish of widely varying size.

In the drawings, which are of a presently preferred form of the apparatus which has been found to be successful in carrying out the invention.

As previously indicated, the machine herein is designed to perform the following operations: (a) to slit the ventral side of the fish to the tail end, (b) to slit the dorsal side to the backbone over the entire length of the butchered fish, (c) simultaneously with (b) to bore out the entire length of the backbone in a controlled and accurate manner, and (d) to remove and place the boned and slit halves of the fish on a conveyor which leads to the skinning equipment.

In my earlier application, Serial No. 669,344 filed May 13, 1946, now Patent No. 2,534,219, issued December 12, 1950, I disclosed certain apparatus and methods for boning fish, in which a pre-slit fish is presented to a machine with the bone adhering to one half thereof, and by means of the instrumentalities disclosed therein, the bone is removed from this one-half part of the fish. The present invention is an improvement over the machine disclosed in that earlier application. With the process of the earlier application, it is necessary to split the fish in a separate operation prior to boning in the machine disclosed. Obviously, it is advantageous to keep a whole fish moving in one line up to the point where it is slit and made ready for presentation to the skinning apparatus, instead of handling two lines comprising respectively fish halves without bones and fish halves with bones.

Figure 1:
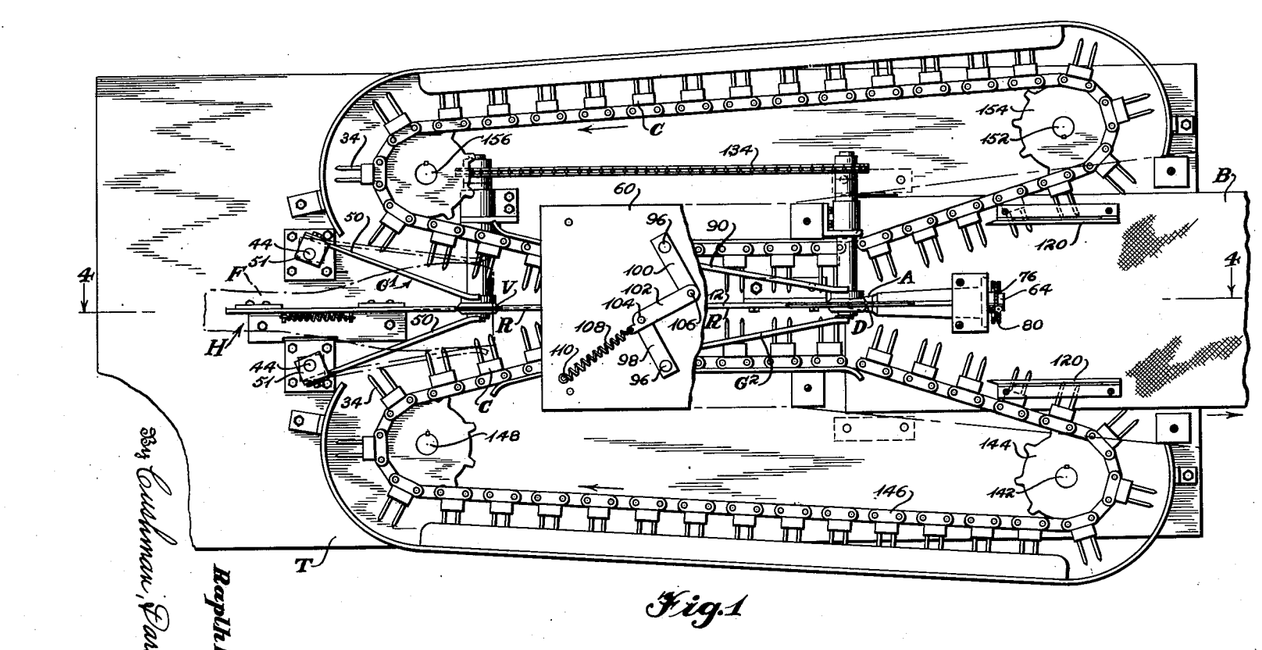
Figure 1 is a top plan view of the equipment as referred to above.
Figure 4:
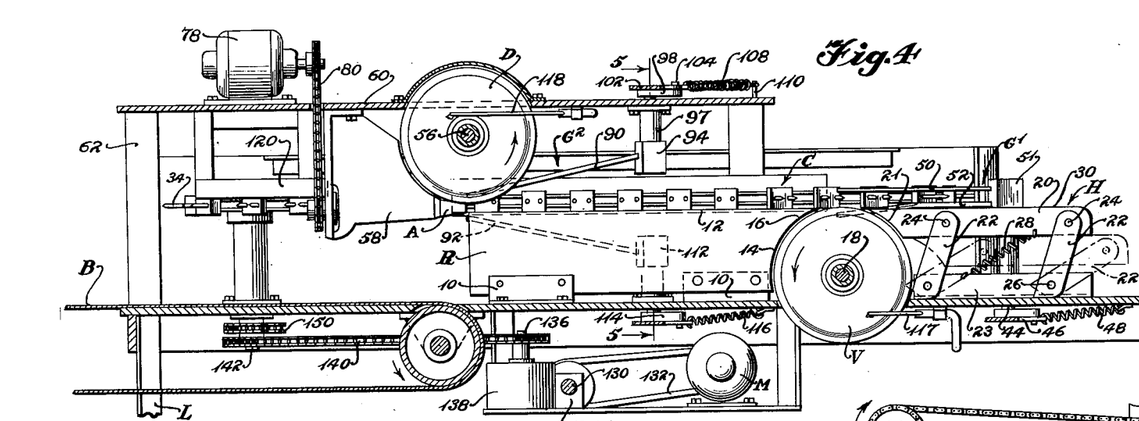
Figure 4 is a longitudinal vertical sectional view through the machine, taken along the line 4—4 of Figure 1.
Figure 5:
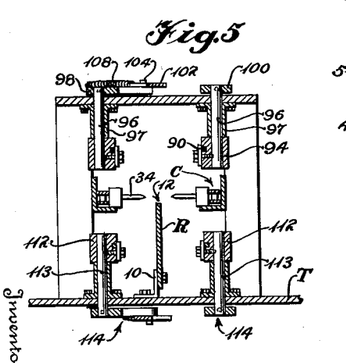
Figure 5 is a partial transverse sectional view of the machine, showing the arrangement of the guiding fingers for the fish, the view being taken along the line 5—5 of Figure 4 with certain parts omitted in order to simplify the view.

The general combination of the machine of the present invention is perhaps best illustrated in Figures 1 and 4 wherein the various instrumentalities to be described are shown supported from a flat table surface T which is supported from the floor by a suitable number of frame members including legs L. Mounted on and above the table, and extending longitudinally through the machine there is a whole fish supporting rail R. The fish are carried through the machine and along the top edge of the rail by side chain conveyors C. The fish are properly delivered to the rail while being initially moved by the conveyor, with the assistance of a retractible horse H centrally positioned on the table at the entrance end of the machine and in central alignment with the rail R. Also near the entrance end of the machine, and located just below the top surface of the rail R, there is a rotating knife V for completing the ventral slitting of the fish from the anus to the tail. Near the exit end of the machine, and positioned in alignment with and above the top surface of the rail R, there is a backbone removing device A. Immediately above this last-mentioned device, and also longitudinally aligned with the rail R and just above the same, is a second slitting knife D which is adapted to complete the dorsal slitting of the fish from its head to its tail substantially down to the backbone of the fish, whereby the backbone is removed and the fish is cut into separate halves, the latter being carried away toward the fish skinning apparatus located farther on in the processing line by any suitable conveyor B, such as one of the belt type.

The rail R is longitudinally and centrally supported above the table T by brackets 10. It has a straight top edge 12 (Figure 4) which is parallel to the table top. This edge serves to index or align the backbone of the fish for proper presentation to the fish boning and slitting apparatus hereinafter described in detail. The rail R serves as a support for the whole fish throughout the larger part of its movement through the machine. This rail should be of such appropriate length that the working parts previously mentioned can be spaced from one another to operate on the fish as they are continuously and successively fed through the machine. The rail R is cut downwardly in an arcuate manner at its end facing the entrance of the machine, as at 14, (Figure 4) leaving a somewhat pointed end edge 16 which partially overlies the top cutting edge of the ventral slitting knife V. This edge prevents the fish from dropping down and being cut through or past the backbone. The ventral slitting knife may be said to be located beneath the top edge 12 of the rail R, although its diameter and the position of its shaft 18 (suitably journalled on the frame) are such that the peripheral cutting edge of the knife passes through a horizontal plane which constitutes a continuation of the top edge 12 of the rail R in a direction toward the entrance end of the machine.

The horse H which delivers the butchered fish onto the rail R and presents the fish to the cutting knife V, comprises a top plate 20 longitudinally positioned in the plane of the rail R and knife V, and a pair of links 22 which are pivoted to the plate 20 and to a suitable bracket 23 on the table T, as at 24 and 26 respectively. A tension spring 28 forming a part of the horse assembly normally maintains the horse in its upright position, which is that of the full lines in Figure 4 of the drawings. When in the upright position, the top edge 30 of the plate 20 of the horse is in the same plane as the top edge 12 of the rail and the top cutting edge of the ventral slitting knife V. The spring 28 is shown suitably connected between the top plate 20 of the horse and the bracket 23 attached to the table top. The spring 28 tends to swing the links 22 counter-clockwise around their pivots 26 as viewed in Figure 4 until the flat lower ends of the links abut against the table top as is apparent from this view. Downward pressure exerted on the top plate 20 of the horse will depress the horse by swinging the links 22 clockwise around pivots 26 against the action of the spring 28.

Figure 9:
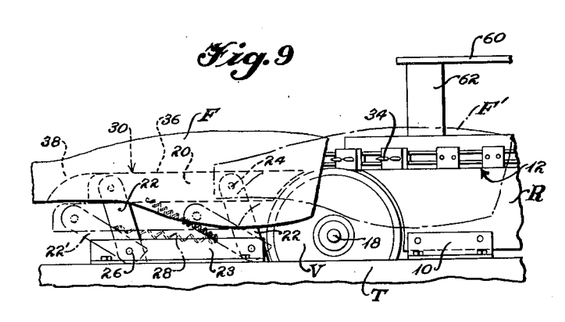
Figure 9 is an enlarged side view, looking inwardly at the entrance end of the machine, illustrating the manner in which the fish is presented to the guide rail and to the ventral cutting knife by the retractible horse.

Referring now to Figure 1, a fish F is shown being fed into the machine longitudinally toward the rail R. The body of a fish thus delivered is impaled by pins 34 which are projected inwardly from the moving conveyors C. The conveyor flights converge at the inlet end and diverge at the outlet end of the machine (Figure 1) and travel parallel to one another between these ends. When pins 34 engage the fish, they pull it inwardly over the ventral slitting knife V and onto and along the rail R. As shown in Figure 9, the fish F when butchered is ventrally slit from its head toward its tail along a line 36 which may be considered to be the lower side of the backbone of the fish, the conventional butchering operation involving such a ventral cut back to the anus area 38 where the cut ceases, the fish being uncut from area 38 to its tail. The fish is initially positioned on the horse H as shown in Figure 9 and is pushed along the top member 20 of the horse (which is in its elevated condition) until the sides of the fish are impaled by the pins 34 extending from the moving conveyor. By reason of the location of the top edge of the plate 20 in the plane of the top edge of the rail R, the fish will be properly aligned and delivered onto the top of the rail as it is initially carried into the machine across the ventral slitting knife V. When the area 38 of the fish reaches the end of the plate 20 of the horse, the latter is retracted downwardly as viewed in Figure 9, i. e., in such manner that the links 22 of the horse assume the depressed positions 22′ against the tension of the spring 28. The retraction of the horse thus permits the fish to continue inward movement fed with its backbone in proper alignment just above and on top edge 12 of the rail R. When the area 38 at the end of the belly cut in the fish meets the ventral slitting knife V, as indicated by the broken line position of the fish at F′ in Figure 9, the knife V completes the ventral slitting of the fish by opening it from the anus area 38 to the tail, and accurately and evenly along the lower side of the backbone of the fish.

In order to further insure the accurate positioning of the fish as it is delivered to the rail R and the knife V first sets of opposite yieldable guiding fingers G′ are provided at the entrance end of the machine. These fingers are fixed at their outer ends to vertical shafts 44, said shafts being mounted for turning movement in hollow posts 45 on the table T, the lower ends of these opposite shafts extending below the table and being interconnected by suitable linkage 46 which is in turn governed by a spring 48 attached to the lower face of the table. The spring 48 tends to rock shafts 44 in such manner as to hold the guiding fingers in inward converging positions as shown in Figure 1. However, the arrangement referred to is such that when a fish is fed into the machine as indicated in Figure 1, the outwardly curved leading edges of the fingers G′ are urged outwardly by the fish, for instance, to the interrupted line position as shown, the yielding action of the fingers serving to properly support and centralize the fish on the rail R, it being noted that these fingers act to support and guide the fish as it is moving into or toward the proper position on the rail R and over the knife V.

Figures 6, 7:
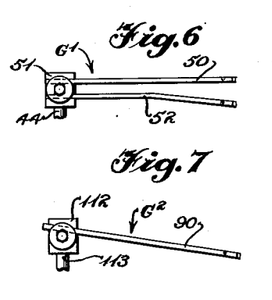
Figure 6 is a side view of an upper pair of yieldable fish guiding members which cooperate with the supporting rail and the moving conveyors. These are spoken of as a first set of guiding fingers.
Figure 7 is a similar side view of one of the fingers which forms the second set of guiding fingers, used for the same purpose as just mentioned.

Referring to Figure 6, it will be observed that this guiding means G′ consists of a pair of guiding elements 50 and 52 which are vertically spaced from one another, the lower element 52 having an end portion which diverges downwardly somewhat from element 50 so that the pairs of elements will support the fish both against lateral and vertical movements on the rail R. It will be understood that the top one of each pair of fingers is designed to contact the fish at a point slightly above the horizontal perimeter of the fish as it passes along the retractible horse, while the lower one of each pair of fingers is designed to contact the fish just below its horizontal perimeter. When the horse is retracted the lower fingers (counterbalanced by the upper fingers) keep the fish in a horizontal position as it moves from the horse to the rail.

The above described control of the delivery of the fish to the rail is of pronounced importance. Any tendency of the tail of the fish to drop down as the horse retracts, thus displacing the fish from the desired exact horizontal alignment and proper vertical location is avoided by the control described. With the top rail of the retractible horse providing central support within the fish, the pairs of guides on opposite sides of the fish receive and support it above and below its perimeter, in a manner similar to the receiving of the fish into a tube, whereby it is properly supported against both horizontal and vertical displacement, and is delivered in proper position with its backbone properly directed onto the rail and over the knife V, being then carried along by the spikes of the conveyor which engage the fish when it is properly positioned in the manner referred to. Obviously, other equivalent mechanisms could be designed to accomplish the same purposes, such as properly arranged guiding rollers or concave guiding plates.

By reason of the position of the guiding fingers G', as shown particularly in Figure 1, the butchered fish may be placed head end first on the retractible horse with its body cavity down, and manually pushed ahead through the first set of centralizing fingers which guide the fish into proper engagement with the spikes 34 of the conveyor. The conveyor then pulls the body cavity of the fish past the central knife, sufficient pressure being exerted to depress the retractible horse when the anus area is reached as previously described. The retraction of the horse exposes the central part of the fish from the anus to the tail to the action of the circular knife V as the fish is pulled onto and along the stationary rail R.

Figure 12:
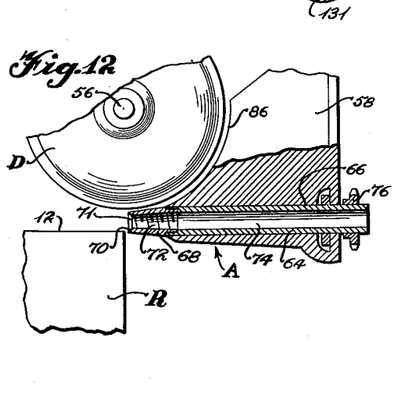
Figure 12 is an enlarged side view which illustrates the close cooperative action of the dorsal slitting knife and a backbone removing implement of the rotary tube type.

As has been previously mentioned, the most important function performed by the machine is the removal of the backbone, and the simultaneous dorsal slitting of the fish throughout its entire length, to separate it into halves. Referring to Figures 4 and 12, it will be observed that the backbone removing implement A is located in alignment with the rail R, being presented in a longitudinal direction toward the movement of the fish, and located just above the top edge 12 of the rail R. The dorsal slitting knife D is of such diameter, and is mounted on a shaft 56 supported in an upper extension of the frame at such distance that the knife D sweeps through a path longitudinally of the rail R with its cutting edge spaced a slight distance above the top edge 12 of said rail. The cutting edge is so located that it is spaced from the top edge of the rail R a distance substantially equal to the average diameter of a fish backbone.

Figure 11:
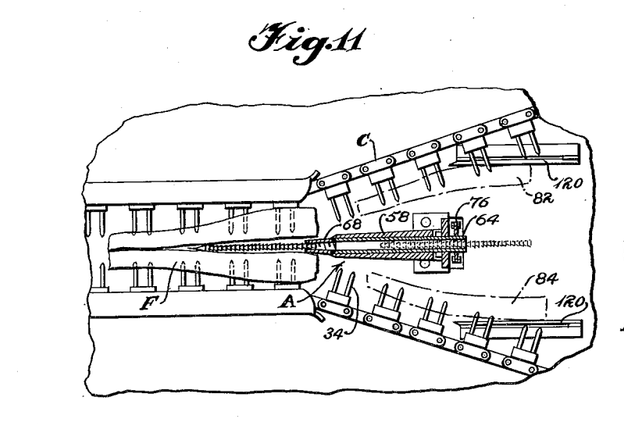
Figure 11 is another view illustrating the important operations just referred to. The view may be considered as taken along the line 11—11 of Figure 10 looking upwardly, with the backbone removing device in section to illustrate its action, the plates for stripping the fish halves from the side conveyor chains also being illustrated.

The preferred embodiment of the backbone removing implement is shown in detail in Figures 11 and 12. This implement is supported by a plate 58 which is bolted to and depends from an overhead supporting plate 60, the latter being supported above and on the table T by suitable leg members 62. The cutting element comprises a driven tube 64 journalled for rotation in a longitudinal opening 66 extending through the lower thickened portion of the separating plate 58. At the forward end of this tube, there is a removable hollow cutter 68 (threaded into the end of the tube). This cutter has a forward circular cutting edge 70, and is inwardly beveled from said cutting edge 70 to a threaded or grooved interior 72, which connects with the hollow bore 74 through the tube 64. The interior of the end 68 of the cutting implement may flare slightly outwardly to the bore of the tube 64. The outer end of the tube 64 extends beyond the end of the plate 58, and is there equipped with a sprocket 76 or other suitable driving means, so that the cutting implement may be rotated at high speed as by a motor 78 mounted on the overhead support 60. The motor may have a driving sprocket connected with the sprocket 76 by a chain 80 (Figures 2 and 4).

Figure 10:
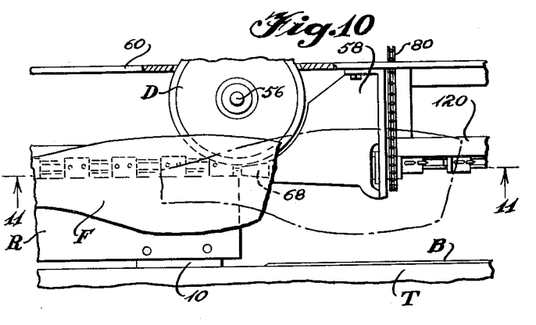
Figure 10 is a similar view at the exit end of machine, showing the important simultaneous action of the dorsal slitting knife and the backbone removing implement.

The backbone removing implement is located with its axis in the plane of the rail R and is positioned between the top edge 12 of the rail and the peripheral cutting edge of the slitting knife D as shown in Figure 12. As the ventrally slit fish is carried to the end of the rail R, while supported thereon with its backbone just above the top edge 12 of said rail, the end of the backbone of the fish near its head is accurately guided into the bore of the cutting implement which bore is defined by the cutting edge 70. When the backbone enters the end of the cutting implement, further movement of the conveyor forces the fish along and around the cutting implement. The cutting implement, which is rotating at high speed (for instance at about 1200 R. P. M.) performs a clean cut along and around the backbone, the backbone passing through the opening 74 in the tube 64 in the manner shown in Figure 11, discharging from the outer end of the tube 64 as shown. I have found that a slight internal taper at the cutting edge of the hollow cutter assists in funneling the bone through the cutter while preventing the latter from cutting through the bone out into the flesh of the fish. Simultaneously with the action of the backbone removing cutter, as described, the rapidly rotating dorsal slitting knife cuts down into the dorsal side of the fish, substantially to its backbone, and this cut is effected along the top side of the fish throughout its entire length. As the backbone is removed and the dorsal slit is completed, the conveyor B carries the opposite fish halves 82 and 84 outwardly into separated relationship, the operation being facilitated by the action of the plate 58 which is located above the backbone removing device and immediately beyond the dorsal slitting knife D. The plate 58 is provided with an arcuate cut away side 86 (Figure 12) so that its action in separating the fish halves is immediate, following the cutting action of the dorsal slitting knife D. The simultaneous action of the cutting implement 68 and the dorsal slitting knife is illustrated in Figure 10.

In order to insure that the backbone is properly centered at the time it is presented to the backbone removing implement, second sets of yieldable guides G2 are provided, there being upper and lower of such guides on each side of the machine, same consisting of fingers 90 and 92 pivoted to rock shafts vertically mounted in the frame, with free and yieldable ends which engage the fish and center same as it approaches the exit end of the rail R. The manner in which these guides are mounted is best shown in Figures 1 and 2. The trailing ends of each of the upper fingers 90 are connected with blocks 94 which are in turn secured to vertical rock shafts 96 (Figure 1) suitably journalled for turning movement in posts 97 depending from the overhead support 60. Mounted above the overhead support 60, there are inwardly directed levers 98 and 100 secured to the shafts 96, and a link 102 is pivoted between the free ends of the levers 98 and 100, respectively at pivot points 104 and 106. A tension spring 108 is connected at one end to an extension of the link 102 beyond the pivot point 104, and at its other end to a pin 110 extending above the top face of the overhead support 60. With the lever action described, it will be apparent that the tendency of spring 108 is to maintain the fingers 90 in their innermost position, as illustrated in Figure 1. However, as a fish approaches the dorsal slitting knife D and the backbone removing device, it will engage the fingers 90 and move them outwardly, but said fingers will exert a sufficient and uniformly applied pressure to hold the fish in proper central position on the rail.

Figure 2:
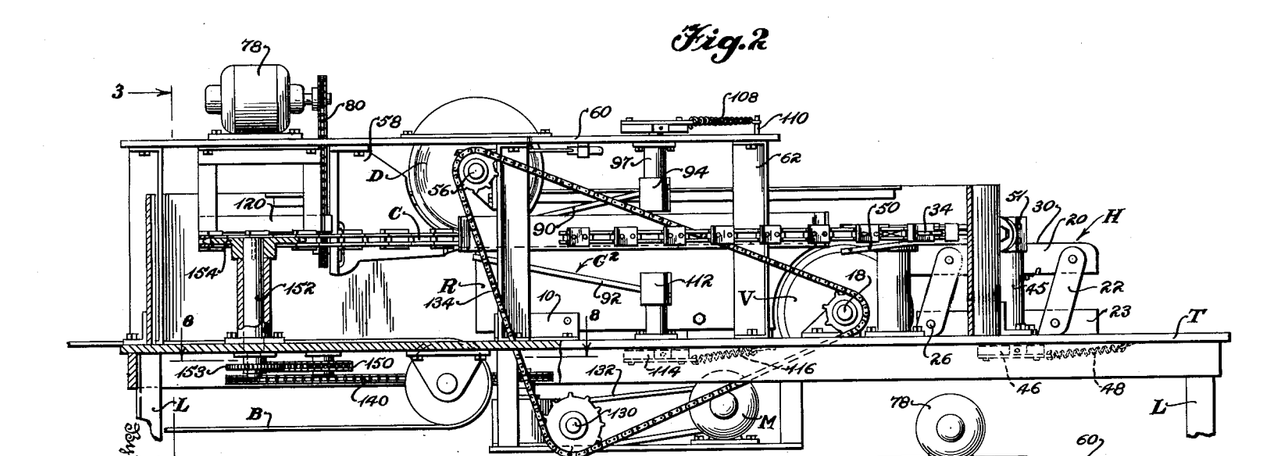
Figure 2 is a side elevational view of the machine, partly in section.
Figure 3:
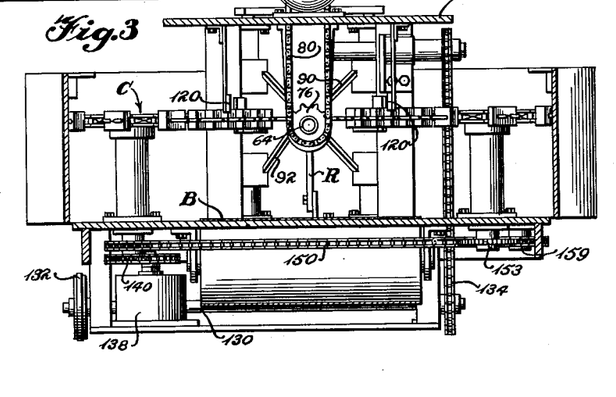
Figure 3 is a transverse vertical sectional view of the machine, taken very near the outlet end thereof on the line 3—3 of Figure 2.

As illustrated in Figures 2 and 4, the second set of guides includes opposite lower guiding fingers 92 mounted in substantially the same manner to provide yielding pressure against the lower areas of the sides of the fish to properly center it. The ends of the fingers 92 are carried by blocks 112 which are secured to vertical shafts 113 mounted for turning movement through the table T, there being similar link and lever combinations 114 controlled by a similar spring 116 connected thereto, and to the table, in order to provide the uniformity of pressure by the lower guiding fingers 92 on opposite sides of the rail R.

It will be understood that the specific description of the link and lever mechanisms mounted above the overhead support 60 is applicable to the link and lever mechanism 46 with its spring 48 which was more generally described in connection with the operation of the first set of guides G¹ located adjacent the inlet end of the machine.

In order to improve the action of the slitting discs V and D, water jets 117 and 118 may be provided extending on opposite sides thereof, as indicated in Figure 4.

Where the conveyor diverges outwardly, and beyond the boning mechanism A, there are suitable scraper plates 120 mounted in depending relation from the overhead support, these plates being properly positioned to separate the slit fish halves 82 and 84 (Figure 11) from the spikes of the conveyor, and when so separated, these halves drop down onto the conveyor belt B (Figures 1, 2, and 4), which carries the fish halves off to the point where they are fed to the fish skinning machiner.

Figure 13:
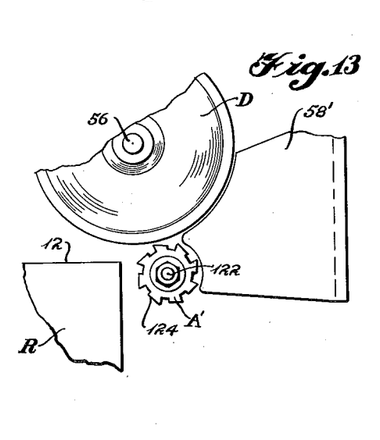
Figure 13 is a similar view showing the use of a modified type of backbone removing device.

In substitution for the hollow tubular cutter B as previously described, a mill-like toothed cutter A' may be provided, as shown in Figure 13. This milling cutter is mounted on a horizontal shaft 122 which is suitably rotated at high speed and is provided with teeth 124 which constitute cutting surfaces likewise positioned in alignment with the upper edge 12 of the rail R, and these teeth act in a zone immediately beneath the cutting edge of the slitting knife D and above the top edge 12 of rail R. This milling cutter may be connected with the power drive of the machine in any suitable way, and when rotated at high speed, it will perform a function similar to that performed by the hollow tubular cutter previously disclosed. The teeth of this cutter engage the backbone and carry it away from the slit halves of the fish.

The mechanism described herein may be operated from any suitable source of power, and by any well known conventional driving mechanisms. For purposes of illustration, however, I have shown the primary source of power as a motor M (Figures 2 and 4) which drives a shaft 130 by means of the belt connection 132. The shaft 130 is provided on its end on the opposite side of the frame from the motor with a sprocket 131 as shown in Figure 2, and an endless drive chain 134 connects this sprocket with sprockets on the shafts 18 and 56, in order to turn the slitting knives V and D respectively. Obviously, the designs of the sprockets or other connections may be varied in order to obtain the desired speeds of rotation, and any type of control mechanisms may be employed such as conventional change speed gears and the like.

By a suitable worm connection at 135, a vertical shaft 136 within a gear box 138 is operated (Figures 4 and 8), and by suitable chain connections 140, a vertical shaft 142 is driven, the upper end of said shaft having a sprocket 144 thereon (Figure 1) which is the drive for the chains 146 of one of the side conveyor flights C. There is an idler shaft 148 with a sprocket wheel thereon for the conveyor flight at the opposite end of the machine as also shown in Figure 1.

Returning to Figure 8, there is a further driving chain connection 150 between the shaft 142 and a shaft 152, this being the drive shaft which extends upwardly through the frame and is provided with a sprocket 154 thereon which drives the opposite conveyor flight as shown in Figure 1. The shaft 156 with sprocket thereon, shown at the opposite end of this conveyor flight, is an idler operating in a manner similar to the shaft 148.

Figure 8:
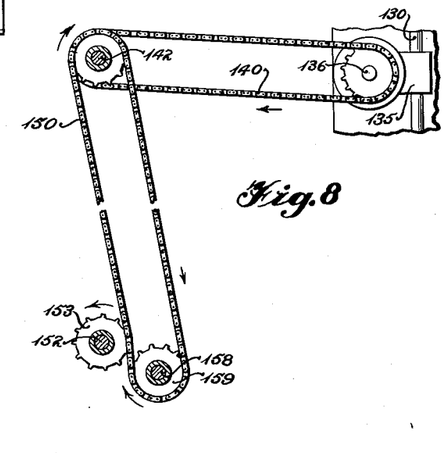
Figure 8 is a detailed view illustrating one form of drive which may be employed with the apparatus, looking in the direction 8—8 of Figure 2.

The shaft 152 is caused to rotate in a direction opposite to that of 142 by means of the idler shaft 158 shown in Figure 8, the chain 150 passing around the sprocket 159 on the idler shaft 158 with the chain 150 meshing with a sprocket 153 on the shaft 152 as shown in this figure.

It will be apparent that by the combination of closely cooperating elements disclosed herein, I have provided a compact and highly mechanical machine which performs the slitting and boning operations with great precision. By the arrangement of parts described and claimed, accurate bone removal and the slitting of the fish into halves is simultaneously accomplished.

I claim:

1. Apparatus for removing the backbone from fish which may vary in size, comprising a frame, an elongated rail mounted on said frame having a fish receiving end and a fish discharging end, said rail having a top horizontal surface for engaging beneath the lower side of the backbone of a ventrally slit fish to align the backbone in parallel relation on the top of said rail, a rotary backbone removing implement mounted on said frame at said discharge end and in alignment with said rail, said implement including cutting surfaces for separating the backbone from the flesh of the fish positioned in the longitudinal path of movement of the backbone of the fish along said rail and slightly above the top surfaces thereof, a rotary knife mounted on said frame above said rail adjacent said discharge end and spaced from said top surface of said rail a proper distance to slit the fish dorsally throughout its entire length down to the top side of the backbone of the fish, means on said frame for rotating said implement and said knife, and means mounted on said frame for conveying the ventrally slit fish along said rail and past said knife and said implement.

2. A construction in accordance with claim 1 wherein a separating plate is provided on said frame in alignment with said rail and beyond said knife to separate the fish into halves after the backbone is removed and the dorsal slitting of the fish is completed.

3. Apparatus for removing the backbone from fish which may vary in size, comprising a frame, an elongated rail mounted on said frame having a fish receiving end and a fish discharging end, said rail having a top horizontal surface for engaging beneath the lower side of the backbone of a ventrally slit fish to align the backbone in parallel relation on the top of said rail, a rotary backbone removing implement mounted on said frame at said discharge end and in alignment with said rail, said implement including cutting surfaces for separating the backbone from the flesh of the fish positioned in the longitudinal path of movement of the backbone of the fish along said rail and slightly above the top surface thereof, a rotary cutting disc positioned immediately above said implement and with its cutting edge closely adjacent to the cutting surfaces of said implement which is adapted to effect a dorsal cut along the entire length of the fish substantially down to the top side of the backbone, said disc being adapted to slit the fish into two halves simultaneously with the removal of the backbone from the fish, means on said frame for rotating said implement and said slitting disc, and means mounted on said frame for conveying the ventrally slit fish along said rail and past said disc and said implement.

4. A construction in accordance with claim 3 wherein said conveying means comprises conveyor chains moving along opposite sides of said rail having spikes to impale the sides of the fish and to thereby propel it along said rail, and wherein yieldable guides are mounted on said frame to engage the sides of the fish in order to centralize it on said rail as it is moved by said conveyor, said guides being positioned to engage and centralize the fish as it is presented to said implement and said cutting disc.

5. Apparatus for removing the backbone from fish which may vary in size comprising a frame, an elongated rail mounted on said frame having a fish receiving end and a fish discharging end, said rail having a top horizontal surface for engaging beneath the lower side of the backbone of a ventrally slit fish to align the backbone in parallel relation on the top of said rail, a rotary knife mounted on said frame with its cutting edge positioned below said top surface for effecting the completion of a ventral cut to the tail of the fish, a rotary backbone removing implement mounted on said frame at said discharge end and in alignment with said rail, said implement including cutting surfaces for separating the backbone from the flesh of the fish positioned in the longitudinal path of movement of the backbone of the fish along said rail and slightly above the top surface thereof, means on said frame for rotating said implement and said knife, and means mounted on said frame for conveying the fish along said rail and past said knife and said implement.

6. Apparatus for removing the backbone from fish which may vary in size, comprising a frame, an elongated rail mounted on said frame having a fish receiving end and a fish discharging end, said rail having a top horizontal surface for engaging the lower side of the backbone of a ventrally slit fish to align the backbone in parallel relation on the top of said rail, a rotary cutting knife mounted on said frame adjacent said receiving end and having a cutting edge movable below the top surface of said rail for effecting the completion of the ventral slitting of the fish to its tail, a rotary backbone removing implement mounted on said frame at said discharge end and in alignment with said rail, said implement including cutting surfaces for separating the backbone from the flesh of the fish positioned in the longitudinal path of movement of the backbone of the fish along said rail and slightly above the top surface thereof, a rotary knife mounted on said frame above said rail adjacent said discharge end and spaced from the top surface of said rail a proper distance to slit the fish dorsally throughout its entire length down to the top side of the backbone of the fish, means on said frame for rotating said implement and said knives, and means mounted on said frame for conveying the ventrally slit fish along said rail and past said knives and said implement.

7. In apparatus of the character described, a frame, an elongated rail on said frame having a fish receiving end and a fish discharging end, said rail having a top horizontal surface for engaging beneath the lower side of the backbone of a ventrally split fish, a retractible horse mounted on said frame for delivering a fish to said rail at its receiving end, said horse comprising a plate positioned in the plane of said rail and having a top edge for engaging beneath the backbone of a butchered fish, and means for normally supporting said plate with its top edge located substantially in the plane of the top surface of said rail, a fish slitting disc mounted on said frame positioned in the plane of said rail at the receiving end thereof and between said rail and said horse, said slitting disc having a cutting edge which is operable through the horizontal plane of the top surface of said rail, said supporting means for said plate being yieldable to permit said plate to be depressed by the unslit rear portion of the ventral side of a butchered fish as the latter is moved along said plate toward said rail, whereby the rear end of the fish is evenly split to the backbone from the anus to the tail and the fish delivered onto said rail with its backbone disposed in proper horizontal alignment on said rail.

8. A construction in accordance with claim 7 wherein conveyor chains for carrying the fish along said rail are provided on opposite sides thereof, said chains having pins to impale the opposite sides of the fish as it is delivered to said rail from said horse.

9. A construction in accordance with claim 7 wherein yieldable side guides are provided on said frame to engage the body of the fish on its opposite sides above its maximum lateral diameter to centralize the fish and restrain it against undesired vertical displacement as it is delivered from said horse to said rail.

10. A construction in accordance with claim 7 wherein a conveyor is provided mounted on said frame for carrying the fish along said rail, said conveyor having means for gripping the fish when carrying the same, and wherein yieldable side guides are provided on said frame to engage the body of the fish on its opposite sides above and below its maximum lateral diameter to centralize the fish and restrain it against undesired vertical and lateral displacement as it is delivered from said horse to said rail.

11. In apparatus of the character described, a frame, a longitudinal rail on said frame on which a ventrally split fish may be supported for movement with its backbone above said rail, a conveyor mounted on said frame having means for gripping a fish and carrying it along said rail, and means for delivering the fish to position where it is gripped by said means on said conveyor comprising a horse having a top plate along which the ventrally split fish is moved, and yieldable guides on opposite sides of said rail having means to engage and support the fish at spaced points against either upward or downward displacement, whereby to present the fish to said rail while engaged by the conveyor gripping means with the backbone of the fish in proper alignment with respect to the top of said rail.

12. Apparatus for removing the backbone from fish which may vary in size, comprising a frame, an elongated rail mounted in said frame having a fish receiving end and a fish discharging end, said rail having a top horizontal surface for engaging beneath the lower side of the backbone of a ventrally slit fish to align the backbone in parallel relation on the top of said rail, a rotary backbone removing implement mounted at said discharge end and in alignment with said rail, a knife mounted above said implement for simultaneously slitting the fish dorsally into halves as the backbone is removed, a retractible horse having a top plate aligned with said rail to support the backbone of the fish while delivering same to said rail, a knife at said receiving end for completing the ventral cut of a butchered fish as it is delivered to said rail, a conveyor having means for gripping the fish and for carrying it along and from said rail, and yieldable guides on said frame for engaging the fish to support it against vertical and lateral displacement as it is fed to said knives, rail and backbone removing implement.

13. Apparatus for removing the backbone from fish comprising a frame, a fixed elongated relatively thin flat rail mounted in a vertical plane on said frame and having fish receiving and discharging ends, said rail having an uninterrupted top horizontal surface for engaging beneath the lower side of the backbone of a ventrally slit fish to support the fish in straddling relation on the rail and to align the backbone in parallel relation on the top of said rail, a backbone removing implement mounted on said frame at the discharge end of said rail and in alignment with the top surface of said rail, said implement having cutting surfaces movable in the path of the backbone of the fish and operable to separate the backbone from the flesh of the fish, means on said frame for actuating the cutting surfaces of said implement, and a conveyor mounted on said frame for moving the ventrally slit fish along said rail and past said implement.

14. A construction in accordance with claim 13 wherein a knife having cutting surfaces for slitting the dorsal side of the fish to its backbone from head to tail is mounted on said frame and above said implement, said knife having means to actuate its cutting surfaces simultaneously with the action of said implement to split the fish into halves as the bone is removed therefrom.

15. Apparatus for removing the backbone from fish comprising a frame, a fixed elongated relatively thin flat rail mounted in a vertical plane on said frame and having fish receiving and discharging ends, said rail having an uninterrupted top horizontal surface for engaging beneath the lower side of the backbone of a ventrally slit fish to align the backbone in parallel relation on the top of said rail, a backbone removing implement mounted on said frame adjacent the discharge end of said rail and having cutting surfaces movable through a path just beyond the end of the top surface of said rail and slightly above the same, means on said frame for actuating the cutting surfaces of said implement to separate the backbone from the flesh of the fish, a conveyor mounted on said frame for moving the ventrally slit fish along said rail and past said implement, a circular knife mounted on said frame above said implement and having a cutting edge for slitting the dorsal side of the fish to its backbone from head to tail, and means on said frame for rotating said knife at high speed whereby to split the fish into halves as the bone is removed therefrom.

16. A construction in accordance with claim 15 wherein said implement comprises a mill cutter mounted on a shaft on said frame and whose cutting surfaces are peripheral teeth.

17. A construction in accordance with claim 16 wherein means are provided on said frame to yieldably support the fish on said rail against lateral and vertical displacement as the fish approaches said implement.

RALPH MARTIN BERGLUND.

REFERENCES CITED

The following references are of record in the file of this patent:

UNITED STATES PATENTS

| Number | Name | Date |
|---|---|---|
| 1,175,601 | Carson | Mar. 14, 1916 |
| 1,365,575 | Waugh | Jan. 11, 1921 |
| 1,470,807 | Carr | Oct. 16, 1923 |
| 1,709,362 | Meissner et al. | Apr. 16, 1929 |